June 24, 1952     J. H. HAMMOND, JR     2,601,392
CONTROL SYSTEM WITH SINGLE PULSE TRAIN
Filed May 27, 1948     2 SHEETS—SHEET 1
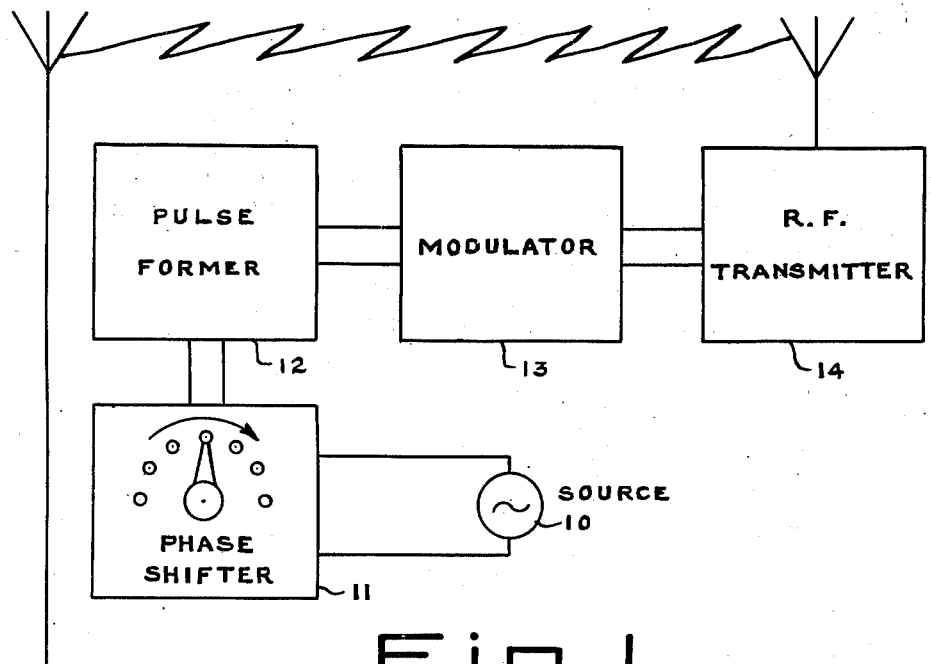
Fig. 1.
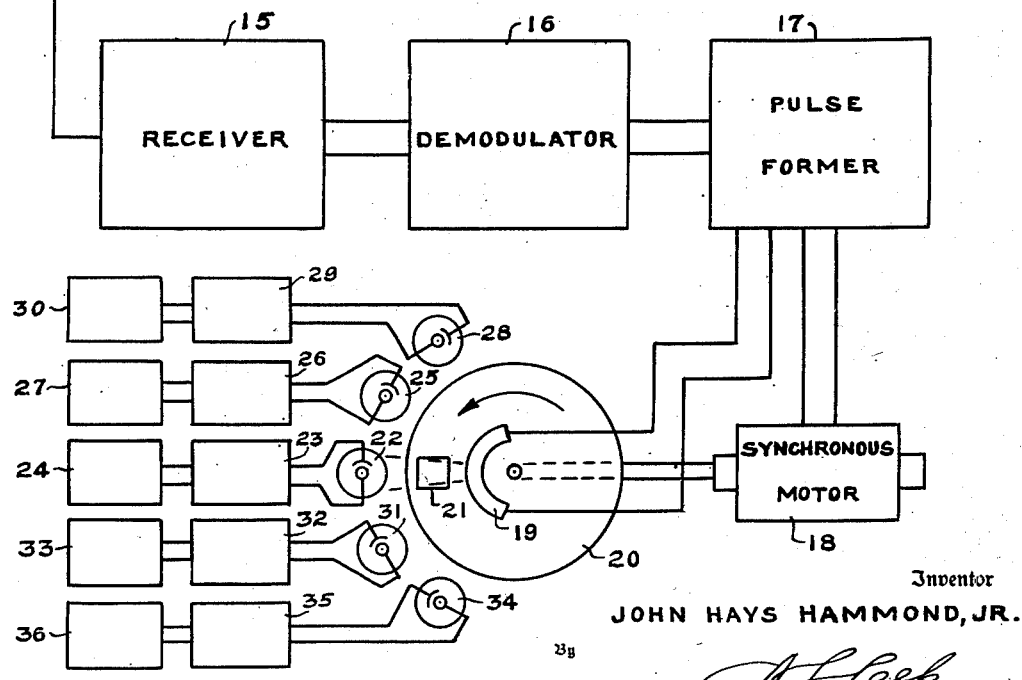
Inventor
JOHN HAYS HAMMOND, JR.
Attorney

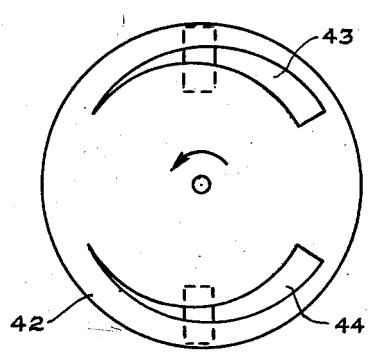
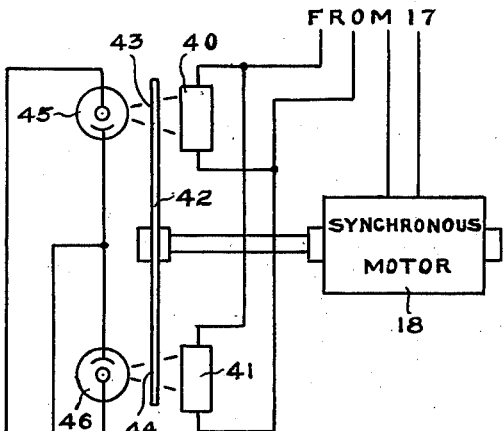
Fig. 2b.  Fig. 2a.
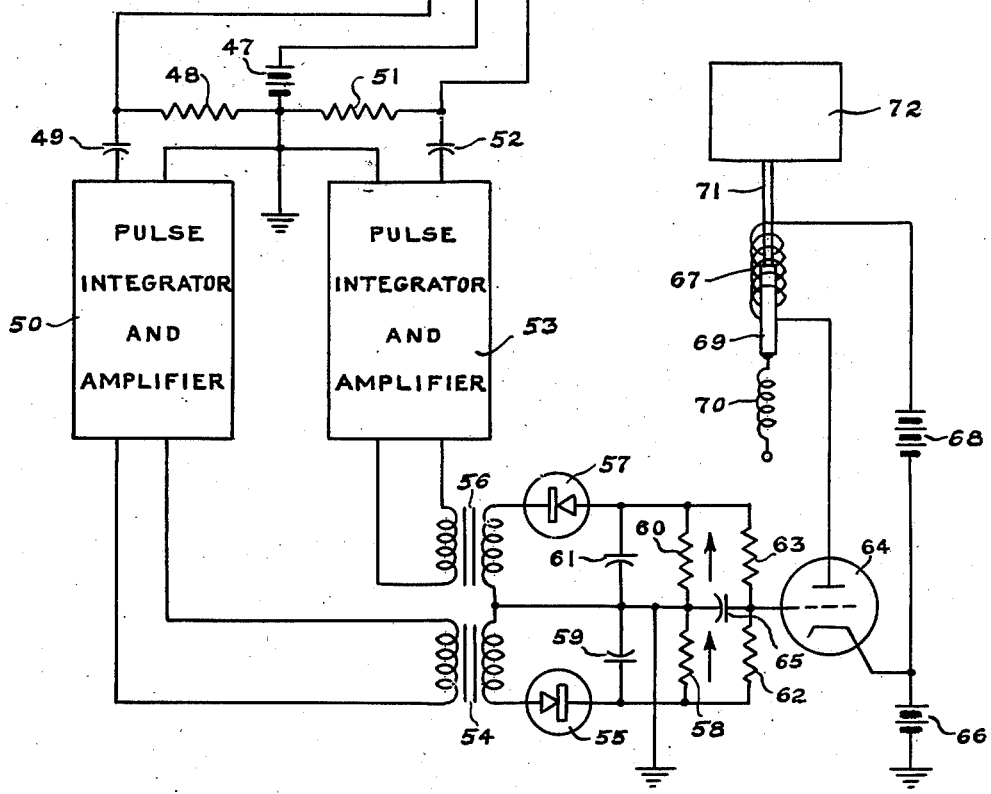
Inventor
JOHN HAYS HAMMOND, JR.
By
Attorney Patented June 24, 1952

2,601,392

UNITED STATES PATENT OFFICE 2,601,392

CONTROL SYSTEM WITH SINGLE PULSE TRAIN

John Hays Hammond, Jr., Gloucester, Mass.

Application May 27, 1948, Serial No. 29,529

5 Claims. (Cl. 177—353)

This invention relates to an electro-mechanical remote control system and more particularly to a system wherein the control is effected by a variation in the pulse rate of a repetitive pulse train.

In a copending application Serial No. 29,528, filed May 27, 1948 now U. S. Patent No. 2,583,373, issued January 22, 1952, I have shown a remote control system using a rotating member at the receiver controlled by a pulse train and a lamp at the receiver flashed by another pulse train, with the control exercised in accordance with the angular position of an aperture carried by the rotating member at the instant of flashing of the lamp.

In the present invention the same pulse train is utilized to control the movement of the rotating member and to flash the lamp. In the steady state with the pulses repetitive at a uniform rate there is a one to one relationship between the timing of the flashes and the angular position of the rotating member. But the steady state condition can be modified by increasing the time interval between pulses or decreasing the time interval between pulses, and then restoring the original steady repetitive state. During the transition period between the two steady state conditions, there will be a transient state due to the mechanical inertia, compliance and other effects, during which the angular position of the rotating member at the instant of flashing the lamp is a variable. As a result there is a ballistic type of displacement in which the rotating member is on the average behind its normal position at the time of flashing of the lamp, provided the repetitive rate is advanced in the transition period. Or if the repetitive rate is retarded during the transition period, the rotating member will on the average be ahead of its normal position at the instant of flashing of the lamp.

The nature of the invention will be better understood from the following description, taken in connection with the accompanying drawings in which certain specific embodiments have been set forth for purposes of illustration.

In the drawings:

Fig. 1 is a schematic block diagram showing a control system in accordance with one form of my invention, Fig. 2a is a schematic diagram showing a control operation in accordance with another form of my invention, and Fig. 2b is a detail view of the disc used in Fig. 2a.

In Fig. 1, the steady state repetitive rate is determined by the frequency of a source 10, which may be an electronic oscillator or other form of alternating current source. The output is connected to the input of a phase shifter 11 which may be of the continuously variable type using two primary windings excited in phase quadrature from source 10, and a secondary winding rotatably and variably coupled to the primary windings, in a well known manner. Or the phase shift may be made in a step by step manner. It will be understood that controls cannot be exercised when the phase shifter is permanently set at a fixed position, but can be exercised only when the setting of the phase shifter is being changed. The output of the phase shifter is connected to the input of a pulse former 12, which for example may produce a pulse each time the wave form impressed upon it passes through zero. These pulses then will be created with a timing interval which is one half the reciprocal of the frequency of source 10. If the phase shifter is being moved say to the right, to advance the phase, then the frequency of the wave form impressed upon the pulse former is momentarily increased, reducing the timing interval, but the original timing interval will be restored when the phase shifter is brought to rest. Or if the phase shifter is being moved to the left, the frequency of its output is being lowered, increasing momentarily the interval between pulses.

The output of the pulse former 12 operates through a modulator 13 to drive a pulse radio transmitter 14 in a well known manner. The radiated wave train of pulse modulated radiant energy actuates a receiver 15, followed by a demodulator 16 which delivers the pulse train to a pulse former 17. In this pulse former 17, some of the energy is converted to substantially sine wave form and is utilized to drive a synchronous motor 18, while other energy is utilized in pulse form to flash a stroboscopic lamp 19. The motor drives a rotating member such as a disc 20, for simplicity shown to be rotating in the plane of the drawing and rotating in the sense indicated by the arrow. There is an aperture 21 in the rotating disc through which light from the lamp 19 may pass when it is flashing. This aperture 21 is shown in the normal position corresponding to the steady state condition when the lamp 19 is flashed after the phase shifter 11 has been at rest for a sufficiently long period of time.

For the steady state condition, the lamp flashes pass through the aperture, illuminate a photo cell 22, producing an electric pulse output applied to integrator 23, which in turn operates a work circuit 24 corresponding to the steady state condition with the phase shifter 11 at rest.

If now the phase shifter 11 is caused to advance, by a clockwise rotation therefore speeding up the rate of arrival of pulses, then the lamp 19 will follow the pulses immediately, but due to the inertia of the mechanical system, the rotating member will tend to continue at its same rate, opposed by the change of torque caused by the difference between the speed of the motor in revolutions per second and the instantaneous frequency of the wave form which drives the motor. The inertia effect at first is predominant so that when the interval between flashes of the lamp corresponds to less than a complete revolution, it flashes just before the aperture has reached the steady state location. Or if the phase shifter is caused to be retarded by a counterclockwise rotation, the time interval between pulses will be increased, causing the lamp 19 to be flashed just after the aperture 21 has gone by its normal steady state position. That is, there will be a ballistic type of displacement between the position of the aperture 21 and the normal position for the steady state condition in a positive sense if the pulse rate is being increased, and in a negative sense if the pulse rate is being decreased. It will be understood that the phase changes are not to be applied of such a great amount or at such a great rate that the motor will fall out of synchronization with the impulses. Both speed of change of phase and amount of change of phase increase the peak amount of the ballistic throw.

Additional cells 25, 28, 31, 34 with integrator amplifiers 26, 29, 32, 35 and work circuits 27, 30, 33, 36 are provided so that other cells than 23 will be actuated during the transient response. Thus for abrupt phase advances, cells 25 or 28 can be energized momentarily; for abrupt phase lags, cells 31 or 34 may be energized momentarily. The work circuit 24 may correspond for example to holding a rudder at a neutral position, circuits 27 and 30 may operate to throw a rudder to the right, and work circuits 33 and 36 to throw the rudder to the left. The total effects of operation of the work circuits may be made additive. Thus a ballistic throw sufficient to energize cell 28 will also energize cell 25 twice during the transient change and the additive effects upon the throw of the rudder may be made to be greater than the effect of a ballistic throw which energizes only cell 25. The work circuits may also be utilized for other remote control purposes such as the control of an unattended radio relay station. It will be understood that other forms of the present invention may be readily practiced. Thus, in place of a phase shifter, I may use an electronic oscillator, with a plurality of push buttons to increase the frequency of the oscillator to simulate a phase advance or to decrease the frequency to simulate a phase lag. Similar effects can be produced by using a single frequency with phase control, or by using a variable frequency.

At the receiver, for ballistic purposes a different relation between the rotating disc and the flashing lamp may be desirable. Thus in Fig. 2a, the pulse former 17 of Fig. 1 as before may drive a synchronous motor 18, which in turn drives a disc 42, and the pulse former 17 also may drive two lamp sources 40 and 41 each registering with an aperture which controls the amount of light passed through the disc 42. The nature of the aperture 43 for lamp 40 and aperture 44 for lamp 41 is more clearly shown in Fig. 2b, where they are shown to be tapered openings by which the amount of light passing therethrough during a flash is the same for both lamps if the flash occurs when the relative position of the apertures and lamps is as depicted. The disc is shown to be rotating in the plane of the drawing, and in the sense indicated by the arrow. If the position of the disc were relatively advanced at the time of the flashing of the lamps, the lamp 40 would transmit more light through its aperture than lamp 41. Conversely if the disc were relatively retarded with respect to the flashing of the lamps, then lamp 40 would transmit less light through its aperture than lamp 41.

Returning now to Fig. 2a, the light beams passing through the two apertures 43 and 44 due to the simultaneous flashings of the two lamps 40 and 41 are caused to fall upon two photo cells 45 and 46, one side of each of which is connected to one end of a polarizing battery 47, the other end of which is connected to ground. The other side of cell 45 is connected to ground through coupling resistor 48, and also through capacitor 49 to one input terminal of a pulse integrator and amplifier 50, the other terminal of which is connected to ground. Similarly the other side of cell 46 is connected to ground through coupling resistor 51, and also through capacitor 52 to one input terminal of pulse integrator and amplifier 53, the other input terminal of which is connected to ground. These amplifiers may be of identical construction, and may deliver alternating current outputs at the rate of flashing of the lamps, and of strengths proportional to the amount of light that is transmitted from the lamps to the cells through the apertures. Thus while the outputs will be equal when the lamps flash at the position of the disc shown, the output of amplifier 50 will be greater or less than that of amplifier 53 in accordance with the apparent advance or retardation of the disc 42 at the instant of flashing.

The output of amplifier 50 is connected to the primary of a transformer 54, one end of the secondary of which is connected to ground and the other to the anode of a rectifier 55. The output of amplifier 53 is connected to the primary of a transformer 56, one end of the secondary of which is connected to ground and the other to the cathode of a rectifier 57. The cathode of rectifier 55 is connected to ground through resistor 58 shunted by capacitor 59, while the anode of rectifier 57 is connected to ground through resistor 60 shunted by capacitor 61. The cathode of rectifier 55 is connected through resistor 62 and the anode of rectifier 57 is connected through resistor 63 to the grid of an amplifier tube 64, which grid is connected to ground through capacitor 65. This network involving elements 54 to 65 constitutes a well known rectifier system producing a D. C. potential on the grid of tube 64 which is zero when the input energies are equal, but is positive or negative if the input from transformer 54 is greater or less than that from transformer 56. The cathode of amplifier 64 is connected to the positive end of battery 66, the negative end of which is grounded. The anode of tube 65 is connected through the solenoid winding 67 to the positive end of a battery 68, the negative end of which is connected to the cathode of tube 64. The solenoid winding 67 cooperates with a plunger 69, to which is attached a spring 70, and a push rod 71 which operates a mechanical work circuit 72. The position of the plunger and the force applied to the work circuit will depend upon the D. C. current in the solenoid winding, and the output force will be determined by the relative amounts of light falling upon the cells 45 and 46.

In the operation, if the time interval between the pulses of the train is momentarily decreased, during an advance of the phase shifter 11 of Fig. 1, the lamps 40 and 41 will flash before the disc has reached its steady state position causing successive pulses on cell 45 to be weaker than on cell 46, and causing the rectifier system to decrease the potential on the grid of tube 64. As a result during the transient interval of reestablishing synchronism, the grid of 64 will be predominantly negative, producing a negative ballistic pulse of plate current and decreasing the force applied to work circuit 72. On the other hand, if the time interval between the pulses is being momentarily increased, the opposite effect will be produced, and a positive ballistic pulse of plate current will increase temporarily the force applied to the work circuit 72. The relation between the force on the work circuit and the instantaneous time interval between pulses at the transmitter is determinable to a certain degree by the constants of the system, but in general the average force on the work circuit can be decreased or increased in accordance with the sense of the changes of timing of the transmitted pulses in passing from one steady state condition to another.

This system is suitable for various selection and control systems such as the control of the various elements of a radio relay station, a teletyping system, receiver tuning or selection, control of moving objects or in general any system requiring selection and actuation of a large number of work circuits.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A control system comprising a transmitter having a source of constant frequency alternating voltage, a pulse former having means responsive to said alternating voltage to produce a short pulse at a predetermined point in each half cycle thereof whereby a train of pulses is produced with a time interval between successive pulses of the train determined by the frequency of said source, and means interposed between said source and said pulse former for shifting the phase relationship of said alternating current supplied to said pulse former for thereby changing the time interval between pulses during the phase shifting period and returning again to the original time interval after said phase changing period and a receiver including means to receive and reproduce said pulses, a photolamp connected to be energized by the received pulses, photosensitive means positioned to be responsive to the flashes of said photo lamp, a rotating member interposed between said photo lamp and said photosensitive means and having an aperture through which rays from said lamp pass to said photosensitive means, and a motor driving said rotating member in synchronism with the timing of the received pulses, said motor and rotating member having mechanical inertia such that with a changing pulse rate the response of the rotating member lags the response of said lamp.

2. A system according to claim 1 in which a plurality of photosensitive means are positioned to be selectively energized in accordance with the angular position of said rotating member at the instant of flashing.

3. A system according to claim 1 in which a pair of photosensitive devices are disposed to be simultaneously energized by said lamp by equal or unequal amounts depending upon the angular position of the rotating member at the instant of flashing, and a work circuit is connected to be energized by an amount and in a sense dependent upon the unbalance in energization of said devices.

4. A system according to claim 3 in which said work circuit includes a mechanically driven energizing means.

5. A system according to claim 4 in which said mechanically driven means is solenoid actuated and the solenoid is connected to be responsive to the unbalance in energization of said devices.

JOHN HAYS HAMMOND, Jr.

REFERENCES CITED

The following references are of record in the file of this patent:

UNITED STATES PATENTS

| Number | Name | Date |
| --- | --- | --- |
| 2,184,355 | Libman | Dec. 26, 1939 |
| 2,321,971 | Becker | June 15, 1943 |
| 2,363,941 | Busignies | Nov. 28, 1944 |
| 2,369,783 | Homrighous | Feb. 20, 1945 |
| 2,382,055 | Homrighous | Aug. 14, 1945 |
| 2,410,523 | Rankin | Nov. 5, 1946 |
| 2,411,147 | Cooley | Nov. 19, 1946 |

FOREIGN PATENTS

| Number | Country | Date |
| --- | --- | --- |
| 560,928 | Great Britain | Apr. 27, 1944 |